US011260936B2

(12) United States Patent
Calley et al.

(10) Patent No.: US 11,260,936 B2
(45) Date of Patent: Mar. 1, 2022

(54) GEARLESS POWER CONVERSION SYSTEM EMPLOYING TWO ELECTRIC MACHINES

(71) Applicant: Planet Rider, LLC, Flagstaff, AZ (US)

(72) Inventors: David Calley, Flagstaff, AZ (US); Steve Purcell, Mountain View, CA (US)

( * ) Notice: Subject to any disclaimer, the term of this patent is extended or adjusted under 35 U.S.C. 154(b) by 0 days.

(21) Appl. No.: 16/628,521

(22) PCT Filed: Jul. 31, 2019

(86) PCT No.: PCT/US2019/044543
§ 371 (c)(1),
(2) Date: Jan. 3, 2020

(87) PCT Pub. No.: WO2020/028588
PCT Pub. Date: Feb. 6, 2020

(65) Prior Publication Data
US 2021/0031873 A1 Feb. 4, 2021

(51) Int. Cl.
*B62M 6/55* (2010.01)
*H02K 11/21* (2016.01)
(Continued)

(52) U.S. Cl.
CPC ............... *B62M 6/55* (2013.01); *B62M 6/45* (2013.01); *B62M 6/65* (2013.01); *B62M 6/90* (2013.01);
(Continued)

(58) Field of Classification Search
CPC . B62M 6/45; B62M 6/55; B62M 6/65; B62M 6/90; B62M 11/14; F16H 1/28; H02K 7/075; H02K 7/108; H02K 7/116; H02K 7/1846; H02K 11/0094; H02K 11/21; H02K 11/24; H02K 2201/12
(Continued)

(56) References Cited

U.S. PATENT DOCUMENTS 4,541,500 A   9/1985 Gelhard
4,871,042 A   10/1989 Hsu et al.
(Continued)

FOREIGN PATENT DOCUMENTS

GB   2458187 A    9/2009
WO   2007039730 A1  4/2007
(Continued)

*Primary Examiner* — Tulsidas C Patel
*Assistant Examiner* — Rashad H Johnson (57) ABSTRACT

A human power conversion system incorporates two or more electric machines to aid in the powering of a vehicle through energy conversion. A first electric machine is coupled with the human powered input and acts as a generator when a human power input is not sufficient to produce electrical power that is provided to a second electric machine that propels the vehicle. The vehicle may be a bicycle and the first electric machine may be coupled to the crank. A bi-coupled electric machine including the first and second electric machines with a common rotor or stator may be employed and coupled to the crank and/or the driven wheel. Power produced by the first electric machine may be provided directly to the second machine or may be stored in a battery and used to propel the vehicle or power other electronic components.

33 Claims, 6 Drawing Sheets

(51) Int. Cl.
*H02K 11/24* (2016.01)
*B62M 6/45* (2010.01)
*B62M 6/65* (2010.01)
*B62M 6/90* (2010.01)
*B62M 11/14* (2006.01)
*H02K 7/075* (2006.01)
*H02K 7/108* (2006.01)
*H02K 7/116* (2006.01)
*H02K 7/18* (2006.01)
*H02K 11/00* (2016.01)
*F16H 1/28* (2006.01)

(52) U.S. Cl.
CPC ............ *B62M 11/14* (2013.01); *H02K 7/075* (2013.01); *H02K 7/108* (2013.01); *H02K 7/116* (2013.01); *H02K 7/1846* (2013.01); *H02K 11/0094* (2013.01); *H02K 11/21* (2016.01); *H02K 11/24* (2016.01); *F16H 1/28* (2013.01); *H02K 2201/12* (2013.01)

(58) Field of Classification Search
USPC ............ 310/67 A, 74, 75 R, 80, 90.5; 475/4
See application file for complete search history.

(56) References Cited

U.S. PATENT DOCUMENTS

| | | | |
|---|---|---|---|
| 5,935,935 A | 8/1999 | Schmidt | |
| 6,092,615 A | 7/2000 | Pusch et al. | |
| 6,803,696 B2 * | 10/2004 | Chen | B60L 50/20 310/268 |
| 7,455,608 B2 | 11/2008 | Moeller | |
| 8,210,974 B2 | 7/2012 | Moeller | |
| 8,395,291 B2 | 3/2013 | Calley et al. | |
| 8,550,199 B2 | 10/2013 | Moeller et al. | |
| 8,651,993 B1 * | 2/2014 | Watarai | F16H 37/065 475/205 |
| 9,688,352 B2 | 6/2017 | Taitt et al. | |
| 10,754,340 B1 * | 8/2020 | Corbett | G05D 1/0088 |
| 2009/0195103 A1 | 8/2009 | Moeller | |
| 2009/0243411 A1 | 10/2009 | Moeller | |
| 2012/0035014 A1 | 2/2012 | Moeller | |
| 2012/0086380 A1 * | 4/2012 | Krieger | H02P 25/18 318/497 |
| 2012/0169154 A1 * | 7/2012 | Curodeau | B60L 15/20 310/43 |
| 2013/0057047 A1 | 3/2013 | Nord et al. | |
| 2013/0278195 A1 * | 10/2013 | Kobayashi | H02P 6/085 318/400.38 |
| 2015/0136509 A1 | 5/2015 | Kaisha et al. | |
| 2016/0009275 A1 * | 1/2016 | Hieda | B60K 28/14 701/70 |
| 2017/0001442 A1 | 1/2017 | Takabe et al. | |
| 2017/0299022 A1 | 10/2017 | Reick et al. | |
| 2018/0154982 A1 | 6/2018 | Gong | |
| 2019/0009770 A1 * | 1/2019 | Kodama | B60L 50/61 |
| 2020/0262516 A1 * | 8/2020 | Hahn | B62M 25/08 |

FOREIGN PATENT DOCUMENTS

| | | |
|---|---|---|
| WO | 2009147375 A1 | 12/2009 |
| WO | 2011033245 A1 | 3/2011 |

* cited by examiner

GEARLESS POWER CONVERSION SYSTEM EMPLOYING TWO ELECTRIC MACHINES

CROSS REFERENCE TO RELATED APPLICATION

This application is a national stage application of PCT/US2019/044543, filed on Jul. 31, 2019 and currently pending, which claims the benefit of U.S. provisional application No. 62/712,668, filed on Jul. 31, 2019, both entitled GEARLESS POWER CONVERSION SYSTEM EMPLOYING TWO ELECTRIC MACHINES; the entirety of both applications are hereby incorporated by reference herein.

BACKGROUND OF THE INVENTION

Field of the Invention

The invention relates to a gearless e-bike system that employs two or more electric machines.

Background

It is known in the art that two electric machines, coupled together with planetary gearing, can be used together to provide a continuously variable ratio hybridize two inputs such as a prime mover and battery or other energy storage. Hybrid automotive drives are well known and commercially successful at combining these two electrical machines and planetary gearing with a battery and an internal combustion engine to increased overall system efficiency and thereby reduced fuel consumption and lower emissions and/or to increase performance in other ways. Similar systems with the same understanding, including planetary gearing, have been proposed and patented for bicycle drives however they have not had commercial success due to the higher sensitivity of weight, efficiency and perhaps greater cost sensitivity also.

Planetary gears or gearing, also referred to herein as epicyclic gear or gearing includes two gears mounted so that the center of one gear revolves around the center of the other. A carrier connects the centers of the two gears and rotates to carry one gear, called the planet gear, around the other, called the sun gear. The planet and sun gears may mesh so that their pitch circles roll without slip. A point on the pitch circle of the planet gear traces an epicycloid curve. In this simplified case, the sun gear is fixed and the planetary gear(s) roll around the sun gear.

All gearing including Planetary gearing have substantial parasitic and torque Induced losses and also generally make noise. On commercially successful e-bikes, a standard set of chain and sprockets are typically used for gearing the human input to drive the bicycle. If an electric drive is added it creates an additional system rather than replacing the existing gear train. If gearing is used for the electric motor to increase torque, the electric motor and its gears are disengaged when not outputting power so as to avoid the parasitic losses from the gearing, noise, and core losses in the motor making pedaling drag. This generally means that regenerating braking energy is not done.

Alternatively, a direct drive motor is used. These systems do generally provide regeneration for braking energy. Direct drive options are generally heavier, more expensive and still cause significant drag on the pedaling work due to significant core losses in the motor.

To review, available a-bikes add the electrical and mechanical complexity, weight, cost and maintenance of the motor, drive and battery to the existing weight, cost, complexity and maintenance of the standard bicycle. In addition, the combination of the electrical and human power typically adds some complexity to the operation of the bicycle both as a bike and as an assisted bike. Even with these drawbacks, e-bikes have become a very popular option globally.

SUMMARY OF THE INVENTION

The invention is directed to a gearless e-bike system comprising a first and second electric machine that work in tandem to provide a desired ratio and input level by a rider. The gearless bike/e-bike system of the present invention eliminates complexity, both mechanically and electrically. In addition, the gearless e-bike system in operation reduces cost, weight and maintenance of the standard bicycle's gearing, while provides continuously electronically variable ratios, regeneration and boosts power from a battery when required. Other desirable features such as, intrinsic generation for onboard electrical needs and precisely measuring human power input are provided without added cost. This invention provides these features with a gearless, light, efficient, and economical device.

First, it is shown that planetary gears or gears at all are not intrinsic to using two or more electric machines to combine a prime mover such as electric machine and internal combustion engine or pedal power. This invention does not need to employ any gears. For the bicycle application a chain or belt may be used for the transfer of power from the pedals or crank to the driven wheel, such as the back wheel. Note that the driven wheel may be a front wheel as well, such with some recumbent bicycles.

Next, the invention discloses a motor with sufficient torque density and efficiency at the required torque so as to not need reduction gearing and thereby eliminates the losses, weight, noise and cost of gearing. The gearless e-bike system of the present invention provides system efficiency that is potentially higher than that of a standard purely mechanical bike drive by providing both high conversation efficiency and allowing braking energy to be recovered. As mentioned this same system provides electrical power such as that more typically provided by a bicycle hub or rim generator and provides complete information on the output of the rider; replacing expensive torque measurement devices, both without added cost or weight.

The invention is directed to a gearless bike and or e-bike drive. Its comprises a first and second or more electrical machine(s) that work in tandem to provide efficient step-less ratio adjustment.

Figure 2:
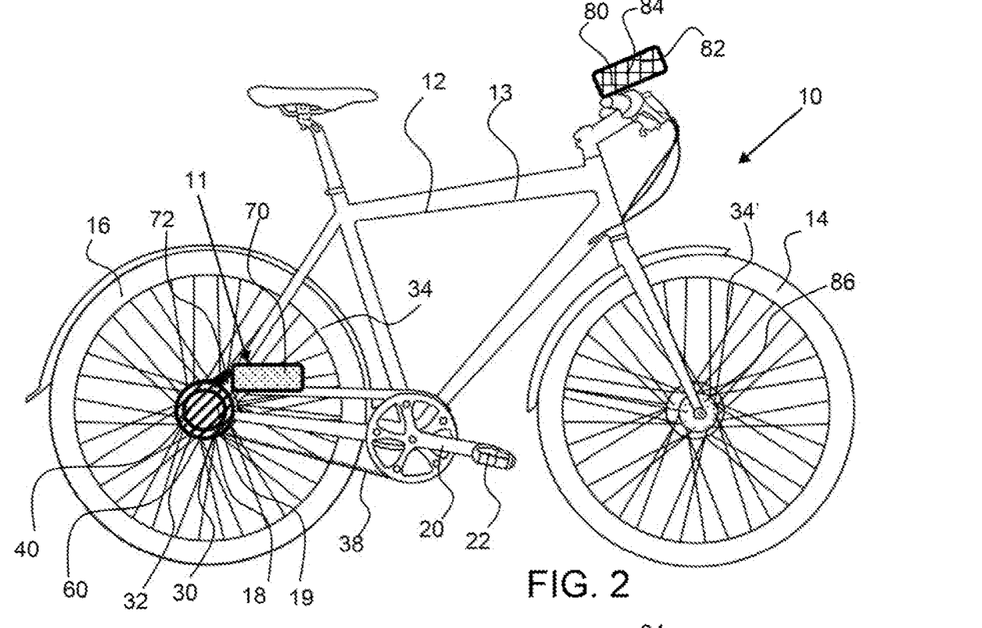
FIG. 2 shows an exemplary e-bike system comprising two electric machines coupled to the back wheel and a rechargeable battery for storing electrical energy.

As a first example of the invention a first configuration of a bicycle drive is described in FIG. 2. The first electrical machine, located in the back wheel hub, is configured with a stator coupled to a pedal crank, typically by a chain or belt. The rotor is coupled to the back wheel. The second electrical machine is also coupled to the rear hub and is configured between the bike frame and the back wheel so that the rotor rotates with the back wheel and the stator is stationary with the bike frame. If the rider's torque and cadence are sufficient, the first electrical machines rotor and stator rotate essentially together as if they were a single part and the second electrical machine freely rotates.

If more torque is required, such as riding up a hill, a controller allows the first electrical machine to slip between its rotor and stator to maintain the rider's desired cadence and torque. This slip generates power which is fed to the second electrical machine which adds the required additional torque.

If the rider's input revolutions per minute (RPM) of the crank, or pedaling cadence, is insufficient, such as going down a hill, power is absorbed from the second electrical machine and is fed to a first electrical machine. This adds RPM to the rider's RPM so that the rider maintains the same desired cadence and the desired bicycle speed is maintained. In this way, a range or continuous, step-less ratios are maintained. When braking, the second electrical machine may absorb the energy, store it in a battery, and provide it back to assist with propelling the bike, and/or for other uses such as lighting when desired.

Figure 3:
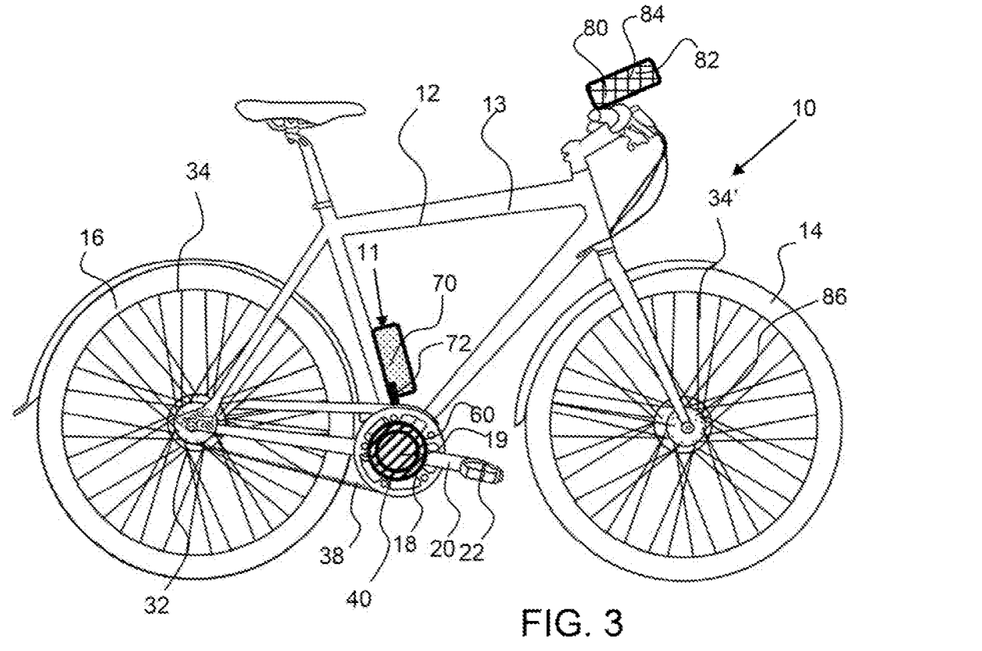
FIG. 3 shows an exemplary e-bike system comprising two electric machines coupled to the crank and a rechargeable battery for storing electrical energy.

In a second example, as shown in FIG. 3, both the first and second electrical machine are located in the bottom bracket. A first electrical machine is configured with a rotor coupled directly to or connected to the pedal crank assembly. The stator is coupled to the back wheel typically by a chain or belt. A second electrical machine is configured between the bike frame and stator of the first electrical machine so that both electrical machines stators rotate together and are coupled to the chain or belt that drives the back wheel. If the rider's torque input and cadence are sufficient the first electrical machines rotor and stator rotate essentially together as if they were a single part and the second electrical machine freely rotates. If more torque is required, such as riding up a hill, a controller allows the first electrical machine to slip between its rotor and stator to maintain the rider's desired cadence and torque. This slip generates power which is fed to the second electrical machine which adds the required additional torque. If the rider's input RPM, or pedaling cadence, is insufficient, such as going down a hill, power is absorbed from the second electrical machine and is fed to a first electrical machine. This adds RPM to the rider's RPM cadence so that the rider maintains the same desired cadence and the desired bicycle speed is maintained. In this way, a range or continuous, step-less ratios in maintained. When braking, the second electrical machine may absorb the energy, store it in a battery and provide it back to assist with propelling the bike or for other uses such as lighting when desired.

Figure 4:
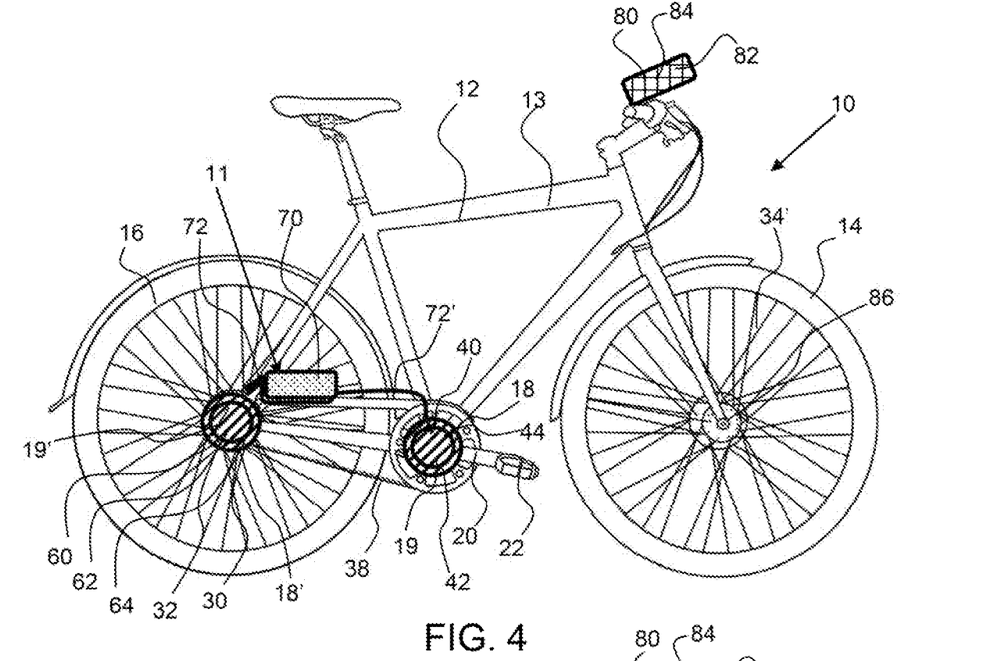
FIG. 4 shows an exemplary e-bike system comprising two electric machines with the second electric machine coupled to back wheel and the first electric machine coupled to the crank.

In a third example, as shown in FIG. 4, the first electrical machine is coupled to the bottom bracket and the second electric machine is located in the back wheel hub. The first electrical machine is configured with a rotor coupled directly to the pedal crank assembly. The stator is coupled to the back wheel typically by a chain or belt. The second electrical machine is coupled to the rear hub, such as being at least partially configured within the rear hub and is configured between the bike frame and the back wheel so that the rotor rotates with the back wheel and the stator is stationary with the bike frame. A belt or chain couples the stator of the first electrical machine to the rotor of the second electrical machine in the rear hub. If the rider's torque and cadence are sufficient the first electrical machine's rotor and stator rotate together according to the chain or belt ratio and the second electrical machine freely rotates. If more torque is required, such as riding up a hill, a controller allows the first electrical machine to slip between its rotor and stator to maintain the rider's desired cadence and torque. This slip generates power which is fed to the second electrical machine which adds the required additional torque. If the rider's input RPM, or pedaling cadence, is insufficient, such as going down a hill, power Is absorbed from the second electrical machine and is fed to a first electrical machine. This adds RPM to the rider's RPM (cadence) so that the rider maintains the same desired cadence and the desired bicycle speed is maintained. In this way, a range or continuous, step-less ratios are maintained. When braking, the second electrical machine may absorb and dissipate the energy, or it may be stored in a battery, and provide it back to assist or for other uses such as lighting when desired.

Figure 5:
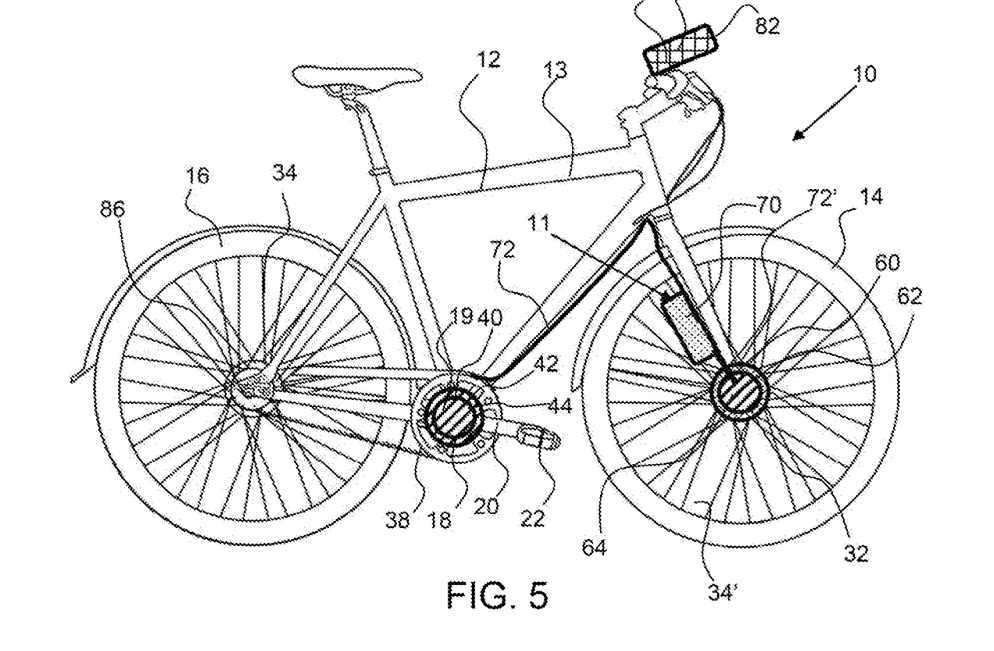
FIG. 5 shows an exemplary e-bike system comprising two electric machines with the first electric machine coupled to crank and the second electric machine coupled to the front wheel.

As a fourth example, as shown in FIG. 5, a first electrical machine is coupled with the bottom bracket. The first electrical machine is configured with a rotor coupled to a pedal crank and the stator is coupled to the back wheel typically by a chain or belt. The second electrical machine is coupled with the front wheel, or non-rider input wheel, such as between the front fork and the front wheel. The stator of the second electrical machine is coupled to the fork and the rotor is coupled to the front wheel. If the rider's torque and cadence are sufficient the first electrical machines rotor and stator rotate essentially together as if they were a single part and the second electrical machine freely rotates. If more torque is required, such as riding up a hill, a controller allows the first electrical machine to slip between its rotor and stator to maintain the rider's desired cadence and torque. This slip generates power which is fed to the second electrical machine through power line, which adds the required additional torque. If the rider's input RPM, or pedaling cadence is insufficient, such as going down a hill, power is absorbed from the second electrical machine and is fed to a first electrical machine. This adds RPM to the rider's pedaling cadence so that the rider maintains the same desired cadence and the desired bicycle speed is maintained. In this way, a range or continuous, step-less ratios in maintained.

When braking, the second electrical machine may absorb the energy, store it in a battery, and provide it back to assist or for other uses such as lighting when desired.

Figure 6:
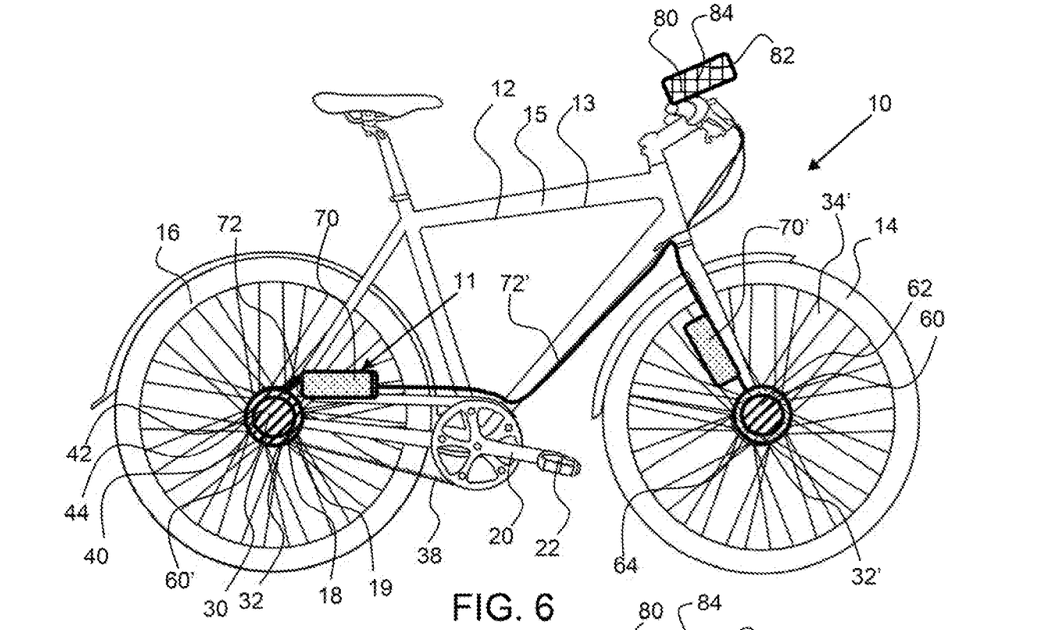
FIG. 6 shows an exemplary e-bike system comprising two electric machines with the first electric machine coupled to back wheel and the second electric machine coupled to the front wheel.

As a fifth example, as shown in FIG. 6, the first electrical machine coupled to the back wheel, or driven wheel. The first electrical machine is configured with a rotor coupled to a pedal crank typically by a chain or belt. The stator is coupled directly to the back wheel. The second electrical machine is coupled to the front wheel, such as being configured between the front fork and the front wheel. The stator of the second electrical machine is coupled to the fork and the rotor is coupled to the front wheel. If the rider's torque and cadence are sufficient the first electrical machines rotor and stator rotate essentially together as if they were a single part and the second electrical machine freely rotates. If more torque is required, such as riding up a hill, a controller allows the first electrical machine to slip between its rotor and stator to maintain the rider's desired cadence and torque. This slip generates power which is fed to the second electrical machine which adds the required additional torque. If the rider's input RPM, or pedaling cadence, is insufficient, such as going down a hill, power is absorbed from the second electrical machine and is fed to a first electrical machine. This adds RPM to the rider's RPM cadence so that the rider maintains the same desired cadence and the desired bicycle speed is maintained. In this way, a range or continuous, step-less ratios in maintained. When braking, the second electrical machine may absorb the energy, store it in a battery, and provide it back to assist or for other uses such as lighting when desired.

Figure 7:
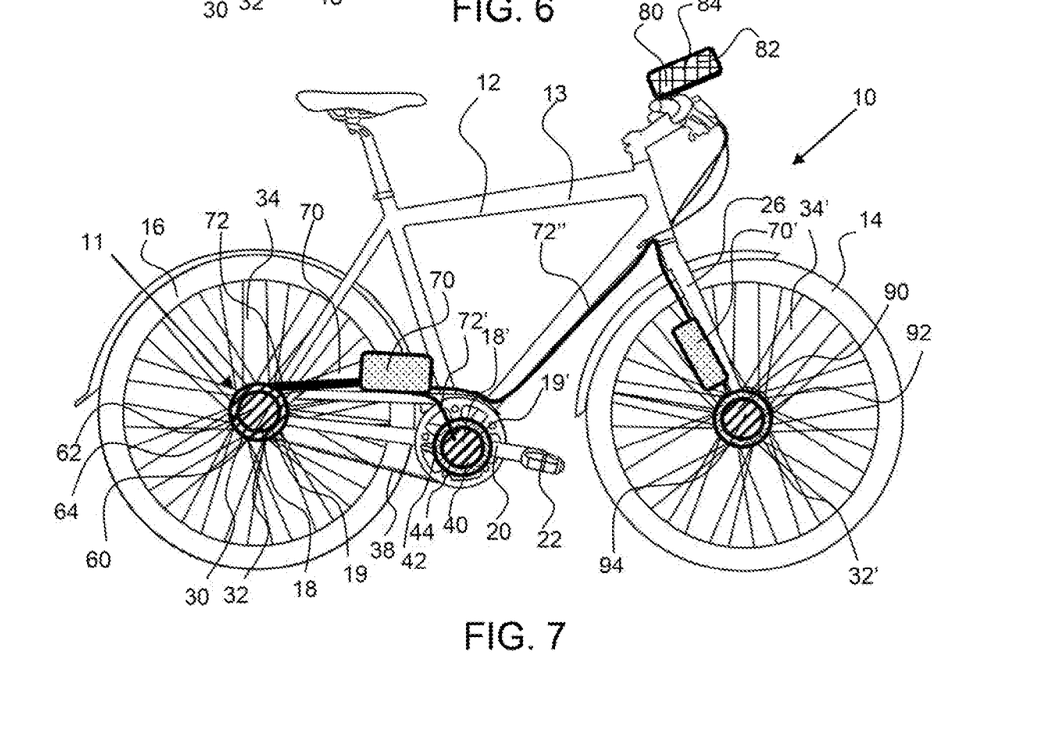
FIG. 7 shows an exemplary e-bike system comprising three electric machines with the first electric machine coupled to the bottom bracket, the second electric machine coupled to the back wheel and the third electric machine coupled to the front wheel.

As a sixth example, as shown in FIG. 7, the first electrical machine is located in the bottom bracket and configured with a rotor coupled directly to the pedal crank. The stator of the first electric machine is coupled to the back wheel typically by a chain or belt. The second electrical machine is coupled to the rear hub and is configured between the bike frame and the back wheel so that the rotor rotates with the back wheel and the stator is stationary with the bike frame. A belt or chain couples the stator of the first electrical machine to the rotor of the second electrical machine in the rear hub. A third electrical machine is coupled to the front wheel, between the front fork and the front wheel. The stator of the third electrical machine is coupled to the fork and the rotor coupled to the front wheel. If the rider's torque and cadence are sufficient the first electrical machines rotor and stator rotate essentially together as if they were a single part and the second and third electrical machines freely rotate. If more torque is required, such as riding up a hill, a controller allows the first electrical machine to slip between its rotor and stator to maintain the rider's desired cadence and torque. This slip generates power which is fed to the second and/or third electrical machine which adds the required additional torque. The second and third electrical machines may share power so as to provide the best traction. If the rider's input RPM, or pedaling cadence, is insufficient, such as going down a hill, power is absorbed from the second and/or third electrical machines and is fed to a first electrical machine. Again, power may be absorbed for best traction. This adds RPM to the rider's RPM/cadence so that the rider maintains the same desired cadence and the desired bicycle speed is maintained. In this way, a range or continuous, step-less ratios in maintained. When braking, the both the second and third electrical machines may absorb the energy based on traction and or safety. The power store it in a battery and provide it back to assist or for other uses such as lighting when desired.

Any of these described examples may take advantage of stored energy from a battery charged to assist the rider. Additionally, no battery is necessary if the system is used with only human input energy. Alternatively, only a small battery may be configured so that only rider's input energy is used but energy may be stored from braking. A small battery may be sufficient for typical bikes electrical needs for auxiliary electrical components including, but not limited to lighting, speakers, charging port for devices, sensors or a meter that measures and displays metrics related to biking.

In any of the above described configurations, multipole electrical machines may be used where only one is described. This may be for example where first electrical machines are described however there are two or more riders and each rider has a "first" electrical machine. Similarly, there may be more than two wheels such as three or four wheeled vehicles. Each electrical machine may be composed of more than one electrical machine for other advantages such as manufacturing, efficiency, or packaging/configuration.

A bicycle, as described herein, in a type of vehicle and may be a two-wheeled bicycle having two wheels aligned but may also be a tandem bicycle and or a bicycle having three of more wheels, or any human powered cycle, such as a recumbent bicycle which may have three or four wheels, or multi-person cycles having a plurality of wheel and in human powered inputs. A bicycle as used herein has at least one wheel and is driven, at least in part, by the human powered input such as the crank which the cyclist pedals.

This gearless multi-electrical machine system may adapted and used with vehicles having an internal combustion engine and/or battery powered and the like, such as hybrid vehicles or adapted to any other power input.

A bi-coupled electrical machine, as defined herein, is an electric machine comprising a first electric machine and second electric machine that are electrically and also mechanically coupled together and wherein the first and second electric machines share an armature, such as the rotor or stator and share power during at least part of operation without gearing between them. An exemplary gearless e-bike system comprises at least two electric machines that can be motors or generators and at least one can be a generator to provide electrical power to the other electric machine either directly or indirectly, such as through a battery. In an exemplary embodiment, a first and second electric machine are configured in a common assembly housing as a bi-coupled electric machine. The first and second electric machines of an exemplary bi-coupled electric machine are coupled together by a common armature, such as a rotor, or stator. For example, a common rotor may be an outer portion of both the first and second electric machines and may be a single rotor that extends across both the first and second electric machines. As described herein a bi-coupled electric machine may be located in a wheel, such as the back wheel of a bike, or coupled with the crank, such as in or at least partially within the bottom bracket, or within a non-driven wheel.

In an exemplary embodiment, the first electric machine assembly housing is coupled to the back wheel, wherein the first electric machine is coupled with a crank, through a chain to the first electric machines inner portion. When the first and second electric machines are coupled to the back wheel, the outer-portion of the electric machines is preferably the rotor, as this makes attachment to the back wheel more straight forward. The rotor may be the outer-portion or inner-portion of the electric machine however. A single fixed gear ratio links the chain ring and the input to the first electric machine through a chain or belt. This single fixed gear ratio may be selected based on the application and user's preferences. A fixed gear ratio between the crank and crank-coupler would typically be a ratio that a fixy, or fixed gear bicyclist, would select. For example, a road cyclist may select from a gear ratio from the crank to crank-coupler of about 3:1 or more, because less torque is required. In another example, a mountain biker may have select a higher gear ratio between the crank and back wheel of 2:1 or less because of back wheel torque requirement.

In an exemplary embodiment, a bicycle comprises a bi-coupled electric machine that is coupled to the back wheel. The bi-coupled electric machine may have a single assembly housing wherein the first and second electric machines are within or share a common assembly housing. The first and second electrical machines outer portion, or stator in some embodiments, may rotate together and be coupled to the back wheel. The rotor of the first electric machine may be coupled to the pedal crank by a chain. The rotor of the first electric machine may slip when the rider's input is not sufficient to maintained a desired pedal RPM cadence. The rotor slips with respect to the back wheel or stator and produces power that is delivered to the second electric machine to produce torque on the back wheel to increase the bike speed.

In an exemplary embodiment, a bi-coupled electric machine is configured in the bottom bracket or directly coupled to the crank, whereby when the rider pedals the crank, this rotates the rotor of the first electric machine, without a chain configured therebetween. In this embodiment, the outer portions, or stator of the first and/or second electric machines may be coupled to the chain to drive at least one wheel of the bicycle, such as the back-wheel. Again, the rotor of the first electric machine may slip when the rider's input is more than sufficient to maintain a desired pedal RPM cadence. The rotor slips with respect to the stator and produces power that is delivered to the second electric machine to produce torque on the chain to produce torque on a wheel, such as the back wheel, to increase the bike speed.

An exemplary gearless e-bike system may comprise a battery for providing power to one or more of the electric machines. The battery may be a rechargeable battery and may be charged from power generated by one or more of the electric machines. A rechargeable battery may store and/or provide power to the first and/or second electric machines. When going downhill or when braking the electric machines may produce electrical energy that is stored in the rechargeable battery and this stored electric energy may be used when the input of the rider is below the rider's desired power level. The brake controller of the bicycle may be coupled to the control system and when a rider activates the brake, one or more of the electric machines may increase the resistance to rotation of one of the wheels to slow the speed of rotation of the wheel. The electric machine would be acting as a generator to apply a braking force to the wheel and would produce electric power that could be stored in a battery for later use. Alternatively, the motor may be used as a resistor to dissipate power for breaking when the battery cannot accept additional power because it is fully or almost fully charged. Or, if the motor/generator cannot accept what power is required, a resistor may be employed to dissipate the required power. These power dissipation concepts and control methods are described in U.S. Pat. No. 6,703,718, to David Calley, et al and PCT/US2008/0101916 to David Calley; the entirety of both are hereby incorporated by reference herein.

An exemplary battery of an exemplary gearless e-bike system may be used to power auxiliary components or devices, such as lights, computing and display systems including, but not limited to, navigational systems, user interfaces, user output displays, speed and distance displays, audio systems, computing devices such as computers, tablet computers and mobile telephones and the like.

The electric machines of the present invention comprise a rotor and stator and acts as either an electric motor or an electric generator. The rotor may be an outer-portion of the electric machine and rotate about the stator. The outer portion of the electric machine is configured radially outside or away from the inner portion. In another embodiment, the outer portion is a stator and the rotor is configured radially inward from the stator and rotates within the stator. In an exemplary embodiment, an electric machine is a transverse flux electric machine as described in: U.S. Pat. Nos. 6,924,579, 6,666,704, 7,800,275, 7,863,797, 7,868,511, 7,876,019, 7,973,446, 7,988,084, 7,851,965, 7,868,508, 7,923,886, 7,994,678, 8,008,821, 8,030,819, 8,193,679, 8,242,658, 8,222,786, 8,760,023, 8,053,944, 8,415,848. U.S. Pat. Nos. 8,405,275, 8,749,108, 8,836,196, 8,854,171, and 8,952,590, to David Calley, et al; the entirety of each is hereby incorporated by reference herein. In an exemplary embodiment, an electric machine is a transverse flux as described in U.S. Pat. No. 9,680,339, to David Calley, the entirety of which is incorporated by reference herein.

An exemplary gearless e-bike system comprises a clutch and the clutch may be a one-way clutch to allow rotation in only one direction.

An exemplary gearless e-bike system comprises a control system that includes a user interface. A rider may input an input level into the control system through the user interface. The control system may monitor the electric machine status, such as revolution per minute, cadence, torque, power and the like. These metrics may be provided to the user on a display. For example, a rider may input a desired revolution per minute (RPM), of 60 and the display may provide the actual revolutions per minute of the crank or the torque input or power input the user is providing to the crank. In an exemplary embodiment, at least one electric machine is coupled with the crank, such as being configured with the bottom bracket or being configured on a wheel with a chain between the crank and crank-coupler and therefore provides feedback metrics regarding the user input. An exemplary gearless e-bike system provides complete information on the riders output such as torque, speed and power which may be useful information for exercising.

An exemplary gearless e-bike system provides a unique way to drive a vehicle such as a bicycle. The inventions primary task is to be an efficient continuously variable transmission for a bike. A secondary task of the exemplary gearless e-bike system is to add stored energy with nothing added except the storage. The net system efficiency should be approximately equal to a standard chain, derailleur and sprocket transmission and all gearing except for a means of coupling for the pedal power to a driven wheel, such as the back-wheel are eliminated. An exemplary gearless e-bike system of the present invention has few parts, such as gears.

Elimination of the gearing allows for several advantages. Foremost, the system efficiency may meet or exceed the efficiency of a standard bicycle chain and sprocket drive in part because breaking energy can be efficiently recovered. The system is less complex and along with lacking the compounded losses of the gearing, it also lacks the noise generated by the gearing and the maintenance requirements of gearing.

An exemplary power conversion system of the present invention may be configured on a vehicle having a driven wheel and an undriven wheel. The system may further comprise a speed sensor on one or more of the undriven wheels and the measured speed may be used to control the speed of a wheel driven by the exemplary gearless electric motor system. The driven wheel may be driven at substantially the same speed as the undriven wheel to avoid slip, such as during breaking, accelerating or when on loose terrain that might cause the driven wheel to slip. On paved roads, the speeds of the driven wheel and undriven wheel may be substantially synchronizes to within about 3% to about 8% of each other and on loose terrain, such as off-road and on dirt or gravel, the speeds of the driven wheel and undriven wheel may be substantially synchronizes to within about 12 to 18%, by the control system and with inputs from integral sensor and/or the speed sensor on the undriven wheel. Substantially synchronizes speed includes speeds of the driven and undriven wheel that are within 20% of each other and the speed is the speed with respect to the contact surface or ground, also referred to as tangential speed, as a driven and undriven wheel may have different diameters. In addition, an integral sensor such as an algorithm including a field oriented control algorithm, or a speed sensor may be coupled with an electric machine and may measure or detect parameter of the electric machine. The integral sensor may utilize a current I vector and current q vector to keep track of the current and field relationships within the motor to determine torque, speed, d and q vectors. These parameters may be used to control one of the electric machines of the power conversion system 11.

In an exemplary embodiment, a power conversion system has no planetary gearing configured between the first and second electric machines but does have gearing between the torque input, such as pedaling a crank, and the first electric machine to change the required rate of torque input, such as revolutions per minute for a crank on an electric bicycle. In an exemplary embodiment, planetary gearing is provided between the crank and the first machine, such as being coupled with a bottom bracket or with an axle of a drive wheel, a wheel driven by the torque input, such as by a chain or belt, as described herein.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

Bicycle, as used herein, refers to any human powered vehicle having one or more wheels such a unicycle or bicycle, a human powered input, such as pedals attached to a rotating crank or to a reciprocating mechanism, and wherein at least one of the wheels is driven by the human powered input, typically by a belt or chain. A bicycle, as described herein, may be a two-wheeled bicycle having two wheels aligned but may also be a tandem bicycle having three of more wheels, or any human powered cycle, such as a recumbent bicycle which may have three or four wheels, or multi-person cycles having a plurality of wheel and in human powered inputs. A bicycle as used herein has at least one wheel is driven by the human powered input such as the crank which the cyclist pedals.

Chain, as used herein, refers to a coupling between the pedal-crank that rotates the crank-coupling and rotates a rotor of the first and in some cases the second electric machine, and may be a traditional chain having coupled chain links, a belt or other suitable coupling.

A crank coupler, as used herein, is the coupling component(s) between the crank and a driven wheel and may include, a chain, belt and/or gear coupled to the driven wheel.

A bi-coupled electrical machine, as defined herein, is an electric machine comprising a first electric machine and second electric machine that are electrically and also mechanically coupled together and wherein the first and second electric machines share an armature, such as the rotor or stator and share power during at least part of operation without gearing between them.

A gearless electrical machine assembly is an assembly of two or more electrical machines wherein power is transferred between the electrical machines without planetary gearing between the electric machine or the output of either electrical machine. The two electrical machines may be coupled together mechanically, a bi-coupled electric machine, or be electrically connected but not co-located, such as one located on the bottom bracket and one on the driven wheel.

A gearless e-bike, as used herein, is a bicycle that is driven by one or more electric machines without gearing between the two electric machines.

Human powered input, as used herein, refers to any mechanical device configured to receive human power input to propel the vehicle and includes pedals attached to a crank that rotate but also includes reciprocating pedals or pedals configured for being powered by hand. A human powered input may also be direct force applied to a wheel, such as in the case of a wheelchair.

A non-rider input wheel, as used herein, is a wheel that does not receive any mechanical power input directly from the rider, such as through pedals coupled with the wheel or a chain coupled to a crank. In a conventional bicycle, the rider pedals and this turns a chain that is mechanically coupled with the back wheel and provides torque to the back-wheel. The front wheel of a conventional bicycle is a non-rider input wheel and freewheels but may have brakes.

The term "coupled to" as used herein to describe an electrical machine coupled to a wheel or crank, means that the electrical machine is physically coupled to the wheel or crank and wherein a portion of the electric machine rotates with the wheel or crank. When an electric machine in coupled to a wheel, a portion of the electric machine may be configured in the hub of the wheel and when an electric machine is coupled to the crank a portion of the electric machine may be configured in the bottom bracket.

Auxiliary electrical components of a bicycle include a light, speaker, control system, display, sensor, charging port for cell phones or other devices and the like. The auxiliary electrical components may have a power requirement of 200 watts or less, or 100 watts of less in the cycling applications.

Vehicle, as used herein, is a mobile thing used for transporting people and/or goods especially on land such as car, truck, cart, bicycle, and the like, and may be manned and un-manned.

Figure 1:
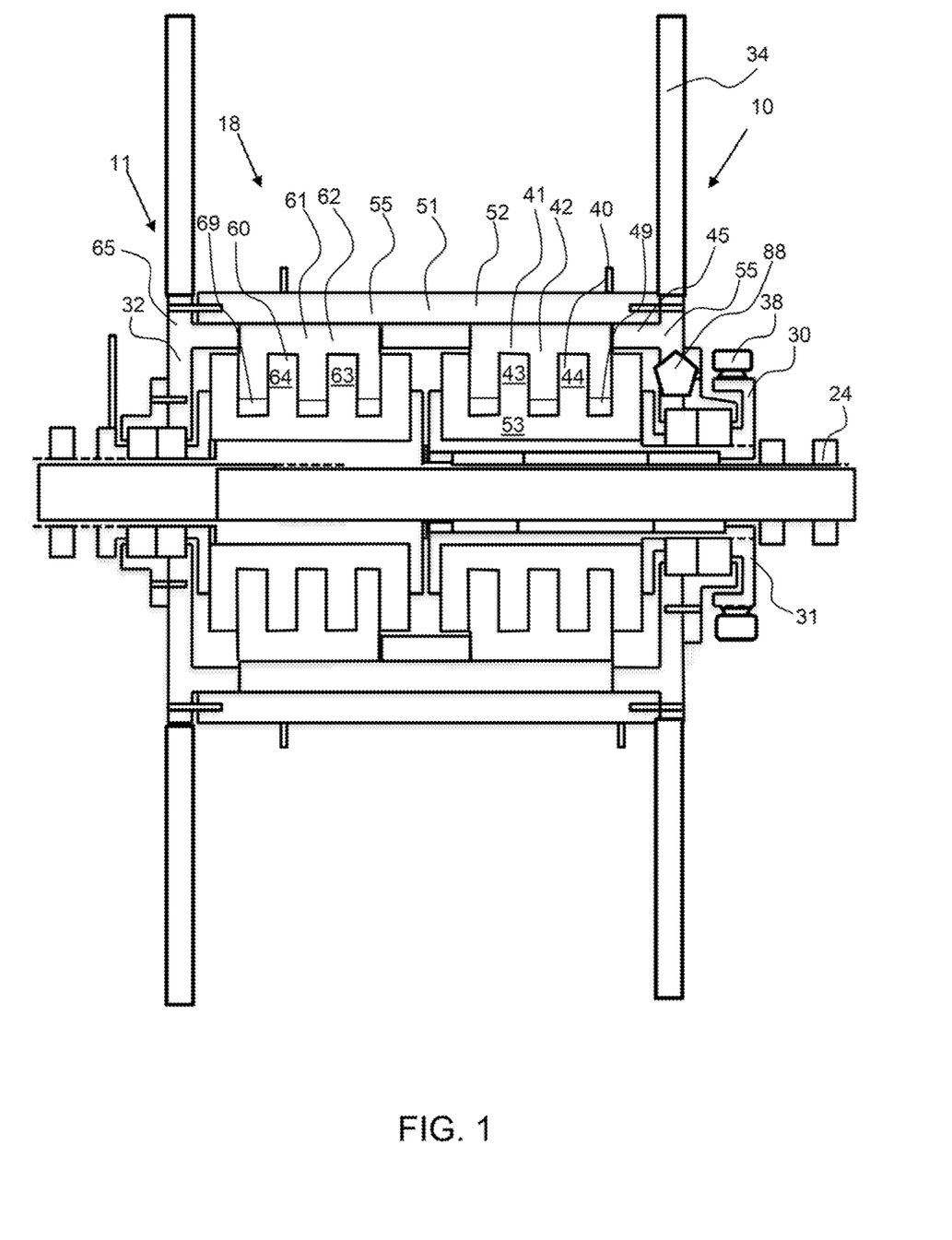
FIG. 1 shows a cross section of an exemplary e-bike system comprising two electric machines.

As shown in FIG. 1, an exemplary e-bike system 10 comprises two electric machines that are physically coupled together by a common outer-portion 51, an example of a bi-coupled electric machine 18. The common outer-portion 51 is the rotor 42 for the first electric machine 40 and the rotor 62 for the second electric machine 60; the common rotor 52 extends across the first and second electric machines. The first electric machine 40 is coupled with the crank by a crank coupling 30, such as a gear 31 having gear teeth. The first electric machine may be directly coupled to the crank or may be coupled to the crank coupling 30 by a chain 38 that extends from the crank (not shown) to the crank coupling on the wheel 34. The second electric machine 60 is coupled to the bicycle by the hub 32. If the rider's torque and cadence are sufficient, the first electrical machines rotor and stator rotate essentially together as if they were a single part and the second electrical machine freely rotates. If more torque is required, such as riding up a hill, a controller allows the first electrical machine to slip between its rotor and stator to maintain the rider's desired cadence and torque and power is fed through the second electrical machine to the wheel. If the rider's input RPM, or pedaling cadence, is insufficient, such as going down a hill, power is absorbed from the second electrical machine and is fed to a first electrical machine. This adds RPM to the rider's RPM cadence so that the rider maintains the same desired cadence and the desired bicycle speed is maintained. In this way, a range or continuous, step-less ratios in maintained. When braking, the second electrical machine may absorb the energy, store it in a battery and provide it back to assist with propelling the bike or for other uses such as for an auxiliary electrical component. The first electric machine 40 has an outer portion 41, such as a rotor 42, as shown, and an inner portion 43, such as a stator 44. A first coil 49 is configured between the first stator and first rotor. The second electric machine 60 has an outer portion 61, such as a rotor 62, as shown, and an inner armature portion 63, such as a stator 64, as shown. A second coil 69 is configured between the second stator and second rotor. The first assembly housing 45 and second assembly housing 65 are a common housing 55 wherein both the first and second inner and outer portions as well as the armatures are within a single common housing. In this exemplary embodiment, the first and second electric machines share a common outer portion 51 or have a common rotor 52, but it is to be understood that they may share a common inner portion 53 and that the inner and outer portions may be a common stator or common rotor depending on the application and location of the electric machine on the bicycle. The bi-coupled electric machine 18 shown in FIG. 1, with the common outer rotor, is preferably configured with a wheel or with a crank with a coupling to the crank, as described herein. The electrical machines shown in FIG. 1 form a power conversion system 11 that comprises no planetary gearing. The bi-coupled electric machine 18 comprises an integral sensor 88 that detects parameters of the electric machine, such as current, to determine, speed, torque and other properties as described herein.

As shown in FIG. 2, an exemplary e-bike system 10 is configured on a vehicle 1, a bicycle 12 having a bicycle frame 13, a front wheel 14, back wheel 16 and pedals 22 coupled with a crank 20. The exemplary e-bike system 10 comprises a power conversion system 11, comprising a first electric machine 40 and a second electric machine 60 coupled with the back-wheel 16. The first and second electric machines may be configured as a bi-coupled electric machine 18. The first electric machine may be coupled with the crank-coupling 30, whereby when a rider pedals the pedals 22 to rotate the crank 20, the chain 38 rotates the crank-coupler and either the outer or inner portion of the first electric machine. The inner or outer portion of first electric machine, such as the rotor or stator, may slip so as to maintain the desired cadence when the rider is not providing enough power to maintain the desired input level and the first electric machine may act as a generator. Alternatively, when the rider's cadence is not sufficient for the bicycle speed required, such as going downhill, the second electrical machine may absorb power and provide added power to the first electrical machine, adding RPM to match the wheel's RPM and passing torque from the crank-coupling 30 to the wheel. In this way the rider's desired cadence is maintained. As described herein, the first electric machine may act as a generator and provide power to the second electric machine and the second electric machine may act as a motor to propel the back wheel. The second electric machine may be coupled with the hub 32. A user may input the desired input level, such as pedaling cadence, into the user input feature 82 and the control system 80. The control system may comprise a microprocessor or other controller that provides instructions to the first and second electric machines to maintain the set input level. The actual input level and other metrics, such as speed of the bicycle, power input level, distance and the like may be displayed on the display 84. A rechargeable battery 70 is coupled with the first and/or second electric machines by a power line 72. The rechargeable battery may store power from one or more of the first or second electric machines and provide this electrical power back to the bi-coupled electric machine when additional torque is required to propel the bicycle. The battery may also provide electrical power to the control system and other systems requiring power, such as lights and the like. The exemplary gearless e-bike system comprises a clutch 19 and this clutch may be a one-way clutch to allow rotation in only one direction. A speed sensor 86 may measure the speed of the undriven wheel and may be configured on the wheel. The speed of the undriven wheel may be used by the control system 80 to control the speed of the driven wheel, or back wheel 16 in this example. The speed of the driven wheel may be substantially synchronized with the speed of the undriven wheel, as described herein, to avoid slip conditions, such as during accelerating or braking.

As shown in FIG. 3, an exemplary e-bike system 10 is configured on a bicycle 12 having a bicycle frame 13, a front wheel 14, back wheel 16 and pedals 22 coupled with a crank 20. The exemplary e-bike system 10 comprises a first electric machine 40 and a second electric machine 60 coupled with the crank 20. The first and second electric machines may be configured as a bi-coupled electric machine 18. The first electric machine may be coupled with the crank 20, whereby when a rider pedals the pedals 22 to rotate the crank 20, either the outer or inner portion of the first electric machine rotates. The inner or outer portion of first electric machine, such as the rotor or stator, may slip so as to maintain the desired cadence when the rider is not providing enough power to maintain the desired input level and the first electric machine may act as a generator. As described herein, the first electric machine may act as a generator and provides power to the second electric machine and the second electric machine may act as a motor to add torque to the chain 38. Alternatively, when the rider's cadence is not sufficient for the bicycle speed required, such as going downhill, the second electrical machine may absorb power and provide added power to the first electrical machine, adding RPM so that the rider's desired cadence is maintained. A user may input the desired input level, such as pedaling cadence or RPM, into the user input feature 82 and the control system 80. The control system may comprise a microprocessor or other controller that provides instructions to the first and second electric machines to maintain the set input level. The actual input level and other metrics, such as speed of the bicycle, power input level, distance, and the like may be displayed on the display 84. A rechargeable battery 70 is coupled with the first and/or second electric machines by a power line 72. The rechargeable battery may store power from one or more of the bi-coupled electric machines and provide this electrical power back to the bi-coupled electric machine when additional torque is required to propel the bicycle. The battery may also provide electrical power to the control system and other systems requiring power, such as lights and the like. A speed sensor 86 may measure the speed of the undriven wheel and may be configured on the wheel. The speed of the undriven wheel may be used by the control system 80 to control the speed of the driven wheel, or back wheel 16 in this example. The speed of the driven wheel may be substantially synchronized with the speed of the undriven wheel, as described herein, to avoid slip conditions, such as during accelerating or braking.

As shown in FIG. 4, an exemplary e-bike system 10 is configured on a bicycle 12 having a bicycle frame 13, a front wheel 14, back wheel 16 and pedals 22 coupled with a crank 20. The exemplary e-bike system 10 comprises two electric machines with the first electric machines 40 coupled to the crank and a second electric machine 60 coupled to the back wheel. The second electric machine 60 is coupled to the back wheel 16 and the first electric machine 40 is coupled with the crank 20 and may configured partially within the bottom bracket. The first electrical machine may be configured with a rotor 42 coupled directly to the pedal crank and the stator 44 coupled to the back wheel typically by a chain or belt. A chain 38 extends from the crank 20 to the back-wheel 16 and is coupled with the second electric machine 60 by the crank coupling 30. The second electric machine has a separate stator 64 and rotor 62. The inner or outer portion of first electric machine, such as the rotor or stator, may slip so as to maintain the desired cadence when the rider is not providing enough torque to maintain the desired cadence and the first electric machine may act as a generator. Power from the first electrical machine may be passed to the second electrical machine to add the required torque. Alternatively, when the rider's cadence is not sufficient for the bicycle speed required, such as when going downhill, the second electrical machine may absorb power and provide added power to the first electrical machine and add RPM so that the rider's desired cadence is maintained. A rider may input the desired input level, such as pedaling cadence or RPM, into the user input feature 82 and the control system 80. The control system may comprise a microprocessor or other controller that provides instructions to the first and second electric machines to maintain the set input level. The actual input level and other metrics, such as speed of the bicycle, power input level, distance, and the like may be displayed on the display 84. A rechargeable battery 70 is coupled with the first and second electric machines by a power line 72, 72' respectively. The rechargeable battery may store power from one or more of the electric machines and provide this electrical power back to the electric machines when additional power is required to propel the bicycle. The battery may also provide electrical power to the control system and other systems requiring power, such as lights and the like. Note that the first and/or second machines may be bi-coupled electric machines, as described herein.

As shown in FIG. 5, an exemplary e-bike system 10 is configured on a bicycle 12 having a bicycle frame 13, a front wheel 14, back wheel 16 and pedals 22 coupled with a crank 20. The exemplary e-bike system 10 comprises two electric machines 40 and 60. The first electric machine 40 is coupled to the crank 20 and the second electric machine 60 is coupled with the front-wheel 14. The inner portion or outer portion of first electric machine 40, such as the rotor 42 or stator 44, may slip so as to maintain the desired cadence when the rider is not providing enough torque to maintain the desired input level and the first electric machine may act as a generator. The power generated by the generator may then be transferred to the second electric machine to power the second electric machine, which acts as a motor to provide torque to the front wheel. Alternatively, when the rider's cadence is not sufficient for the bicycle speed required, such as going downhill, the second electrical machine may absorb power and provide added power to the first electrical machine and add RPM so that the rider's desired cadence is maintained. A user may input the desired input level, such as pedaling cadence or RPM, into the user input feature 82 and the control system 80. The control system may comprise a microprocessor or other controller that provides instructions to the first and second electric machines to maintain the set input level. The actual input level and other metrics, such as speed of the bicycle, power input level, distance, and the like may be displayed on the display 84. A rechargeable battery 70 is coupled with the first and second electric machines by a power line 72, 72' respectively. The rechargeable battery may store power from one or more of the electric machines and provide this electrical power back to the electric machines when additional torque is required to propel the bicycle. The battery may also provide electrical power to the control system and other systems requiring power, such as lights and the like. The first and second electric machines may be bi-coupled electric machines, as described herein.

As shown in FIG. 6, an exemplary e-bike system 10 is configured on a bicycle 12 having a bicycle frame 13, a front wheel 14, back wheel 16 and pedals 22 coupled with a crank 20. The exemplary e-bike system 10 comprises two electric machines 40 and 60. The first electric machine 40 is coupled to the back wheel 16, between the crank coupling 30 and the hub 32, and the second electric machine 60 is coupled with the front-wheel 14, between the fork of frame 13 and the hub 32'. The inner portion or outer portion of first electric machine 40, such as the rotor 42 or stator 44 may be coupled with the crank 20 by the chain 38 and a crank coupling 30 and may slip so as to maintain the desired cadence when the rider is not providing enough power to maintain the desired input level and the first electric machine may act as a generator. The power generated by the first machine generator may then be transferred by power lines 72 and 72' to the second electric machine that acts as a motor to provide torque to the front wheel. Note that the first electric machine 40 may be a bi-coupled electric machine 18 and may provide power to a secondary electric machine 60' of the bi-coupled electric machine and/or to the second electric machine 60 on the front wheel. The power generated by the first electric machine when acting as a generator may be delivered to one or more of the second electric machines 60 and/or 60'. Alternatively, when the rider's cadence is not sufficient for the bicycle speed required, such as going downhill, the second 60 and or 60', electrical machine(s) may absorb power and provide added power to the first electrical machine, adding RPM so that the rider's desired cadence is maintained. A user may input the desired input level, such as pedaling cadence or RPM, into the user input feature 82 and the control system 80. The control system may comprise a microprocessor or other controller that provides instructions to the first and second electric machines to maintain the set input level. The actual input level and other metrics, such as speed of the bicycle, power input level, distance, and the like may be displayed on the display 84. A rechargeable battery 70 is coupled with the first 40 and second electric machines 60 by a power line 72, 72' respectively. The rechargeable battery may store power from one or more of the electric machines and provide this electrical power back to the electric machines when additional torque is required to propel the bicycle. The battery may also provide electrical power to the control system and other systems requiring power, such as lights and the like. The first and second electric machines comprise a first electrical machine 40 and second electric machine 60. A pair of rechargeable batteries 70, 70' are coupled with the first and second electric machines by a power line 72, 72' respectively. The rechargeable batteries may store power from one or more of the electric machines and provide this electrical power back to one of the other electric machines when additional torque is required to propel the bicycle. The battery may also provide electrical power to the control system and other systems requiring power, such as lights and the like. Note that the first 40 and/or second machine 60 may be bi-coupled electric machines, as described herein.

As shown in FIG. 7, an exemplary e-bike system 10 is configured on a bicycle 12 having a bicycle frame 13, a front wheel 14, back wheel 16 and pedals 22 coupled with a crank 20. The exemplary e-bike system 10 comprises a first electric machine 40 coupled to the crank or bottom bracket, second electric machine 60 coupled to the back wheel and a third electric machine 90, coupled to the front wheel. The first electrical machine 40 is coupled with the crank and may be configured at least partially within the bottom bracket and configured with a rotor coupled directly to the pedal crank and stator that is coupled to the back wheel 16 typically by a chain or belt. The second electrical machine 60 is coupled with the back wheel hub 32 and is configured between the bike frame 13 and the back wheel 16 so that the rotor 62 rotates with the back wheel and the stator 64 is stationary with the bike frame. A belt or chain 38 couples the stator 44 of the first electrical machine 40 to the rotor 62 of the second electrical machine in the rear hub. A third electrical machine 90 is coupled to the front wheel and may be configured between the front fork 26 and the front wheel 14. The stator 94 of the third electrical machine is coupled to the fork and the rotor 92 coupled to the front wheel. If the rider's torque and cadence are sufficient the first electrical machines rotor and stator rotate essentially together as if they were a single part and the second and third electrical machine freely rotates. If more torque is required, such as riding up a hill, a controller allows the first electrical machine to slip between its rotor 42 and stator 44 to maintain the rider's desired cadence and torque. This slip generates power which is fed to the second and third electrical machine which adds the required additional torque. The second and third electrical machines may share power so as to provide the best traction. If the rider's RPM (cadence) is insufficient, such as going down a hill, power is absorbed from the second and or third electrical machines and is fed to a first electrical machine. Again, power may be absorbed for best torque. Power fed to the first electrical machine adds RPM to the rider's RPM (cadence) so that the rider maintains the same desired cadence and the desired bicycle speed is maintained. In this way, a range or continuous, step-less ratios in maintained. When braking, the both the second and third electrical machines may absorb the energy based on traction and or safety. The power store it in a battery and provide it back to assist or for other uses such as lighting when desired. The electric machine coupled to the crank or bottom bracket and/or the electric machine coupled to the back wheel may be a bi-coupled electric machine 18 having a first and second electric machine. A user may input the desired input level, such as pedaling cadence or RPM, into the user input feature 82 and the control system 80. The control system may comprise a microprocessor or other controller that provides instructions to the first and second bi-coupled electric machines to maintain the set input level. The actual input level and other metrics, such as speed of the bicycle, power input level, distance, and the like may be displayed on the display 84. A pair of rechargeable batteries 70, 70' are electrical coupled with the first 40,60 and third 90 electrical machines by power lines 72, 72' respectively. The rechargeable batteries may store power from one or more of the electric machines and provide this electrical power back to the electric machines when additional torque is required to propel the bicycle. The battery may also provide electrical power to the control system and other systems requiring power, such as lights and the like. Note that the first second and/or third electric machines may be bi-coupled electric machines, as described herein.

Figure 8:
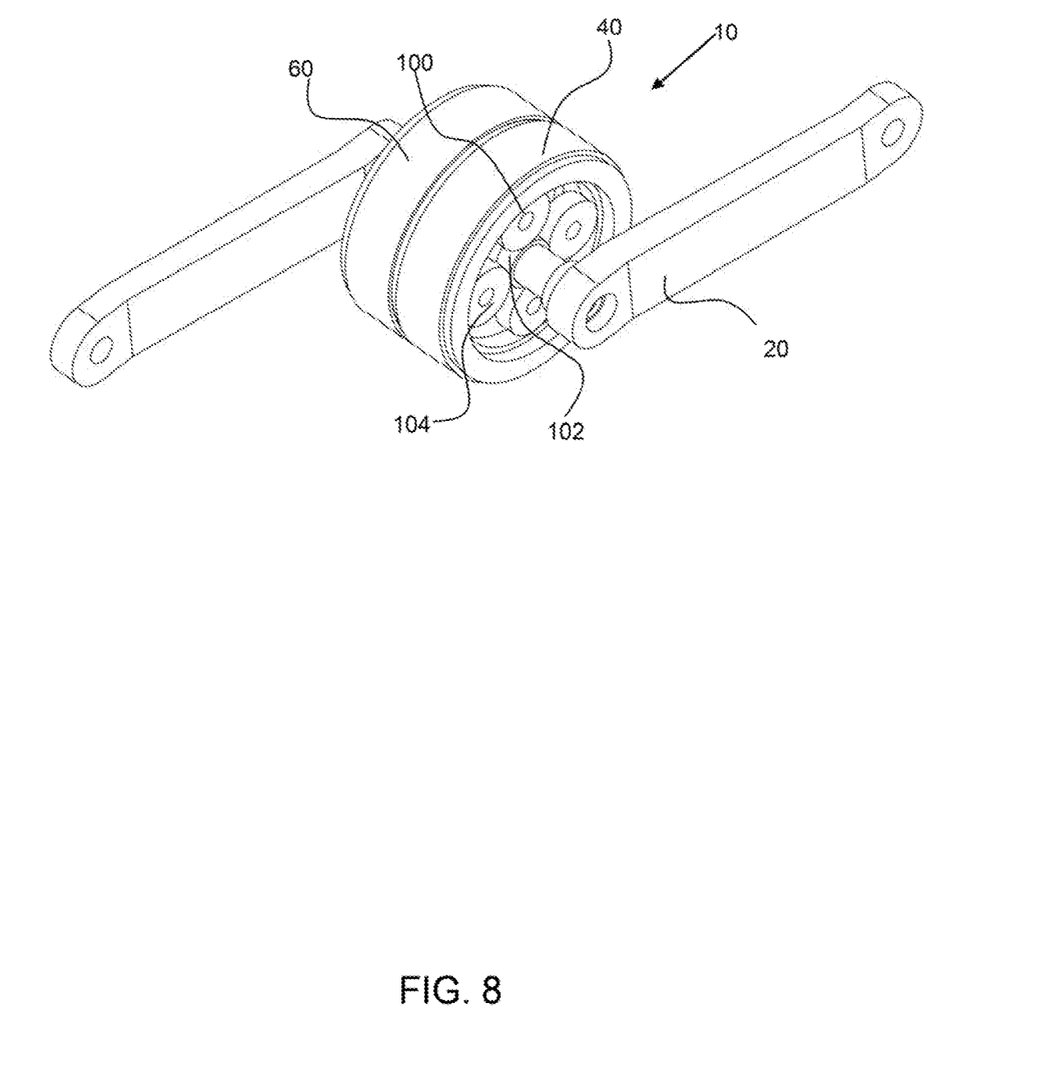
FIG. 8 shows perspective view an exemplary first machine having planetary gearing between the first machine and the torque input, a crank.
Figure 9:
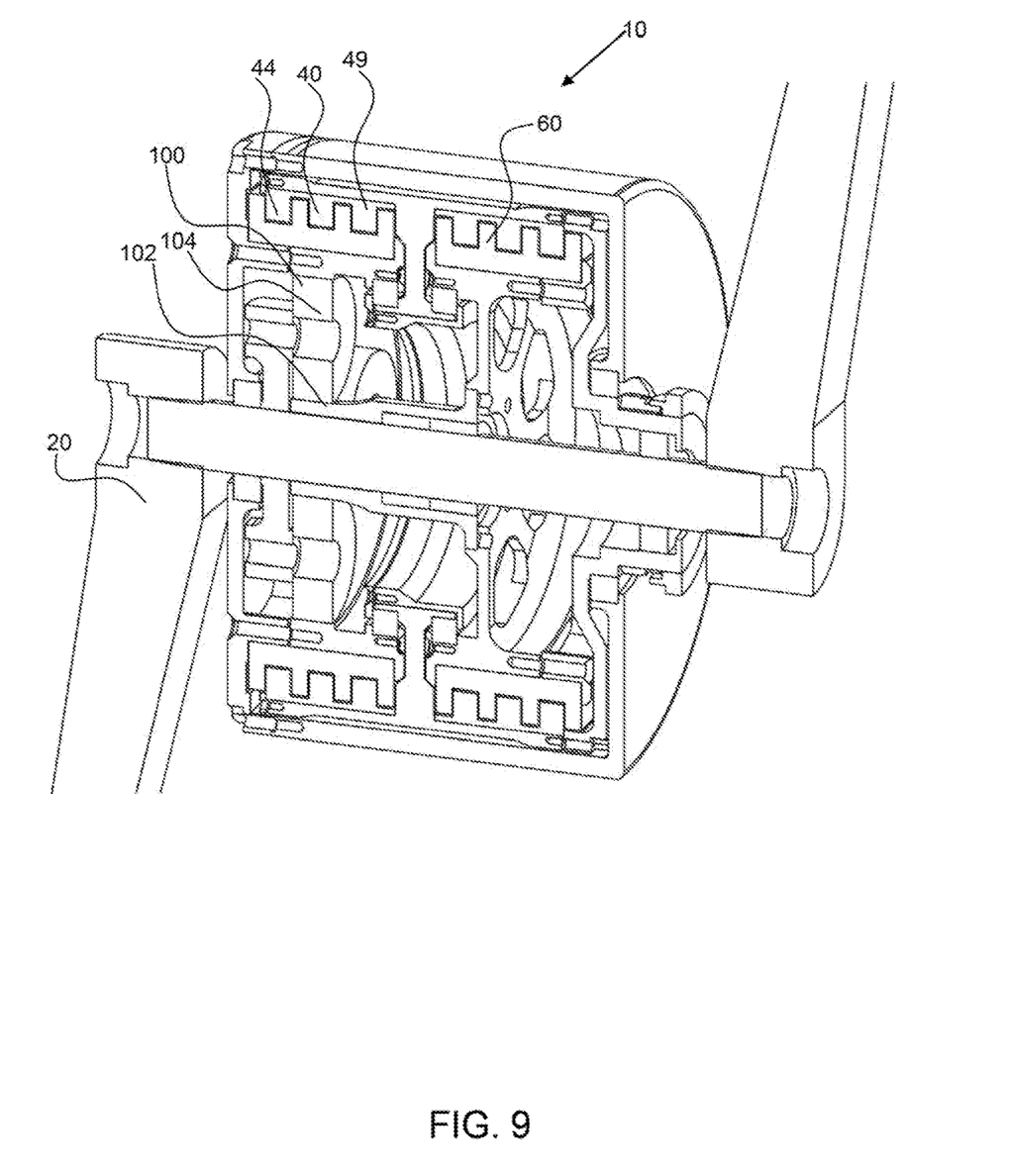
FIG. 9 shows perspective cut-away view an exemplary first machine having planetary gearing between the first machine and the torque input, a crank.

Referring now to FIGS. 8 and 9, an exemplary gearless e-bike system 10 comprise planetary gearing between the torque input, the cranks 20 that are pedaled, and the first electric machine 40. As shown in FIG. 8, four planetary gears 104 are configured around the sun gear 102 in the planetary gearing 100 assembly. FIG. 9 shows the internal configuration of an exemplary planetary gearing 100 assembly to provide gearing between the torque input, the crank 20, and the first electric machine 40. Note that the second electric machine 60 does not comprise planetary gearing and there is no planetary gearing between the first and second electric machines.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A power conversion system comprising:
   a gearless electrical machine assembly comprising:
   first electric machine comprising a rotor and a stator; and
   a second electric machine;
   a torque input to the first electric machine, wherein said torque input rotates one of said rotor or stator of said first electric machine;
   an output of the power conversion system;
   wherein there is no planetary gearing configured between the first and second electric machines;
   a controller;
   wherein the gearless electrical machine assembly, with instructions from the controller, is configured to provide a variable ratio between said torque input to the first electric machine and said output of the power conversion system; and
   whereby one of said stator or said rotor slips with respect to the other to generate electrical power that is provided back to the output of the power conversion system; and
   wherein said torque input to the first electrical machine passes mechanically to the output of the power conversion system, and any differences in power required for ratio changes are exchanged electrically between the first electrical machine and the second electrical machine via a power cable or a shared armature.

2. The power conversion as in claim 1, wherein there is no planetary gearing on either of the first electrical machine or second electrical machine.

3. The power conversion as in claim 1, further comprising a battery that stores energy from the power conversion system.

4. The power conversion as in claim 3, wherein the second electric machine has a stator and a rotor, and wherein the second electrical machine is configured to produce generated electrical power from the output of the power conversion system, whereby one of said stator or said rotor of said second electric machine slips with respect to the other to produce said generated electrical power and wherein said generated electrical power is transferred to the battery or transferred electrically to the first electrical machine.

5. The power conversion as in claim 1, wherein the battery receives a charge from an external source.

6. The power conversion system as in claim 1, wherein a one-way clutch is configured between the input and output of the first electrical machine.

7. The power conversion system as in claim 1, wherein the power conversion system is coupled to a vehicle having a driven wheel and an undriven wheel, and wherein the power conversion system further comprises a speed sensor that is configured on said undriven wheel and wherein the controller substantially synchronizes the speed of the driven wheel with that of the undriven wheel.

8. The power conversion system as in claim 1, wherein the power conversion system is coupled to a vehicle having a first driven wheel and a second driven wheel, and wherein the controller substantially synchronizes the speed of the first driven wheel with that of the second driven wheel.

9. The power conversion system as in claim 1, wherein the first electrical machine comprises an integral sensor that measures torque input to the first electrical machine, power and speed of the first electrical machine.

10. The power conversion system as in claim 9, wherein the second electrical machine comprises an integral sensor that measures the speed and torque of the second electrical machine.

11. The power conversion system as in claim 1, wherein the first electric machine has a stator and rotor and whereby one of the stator or rotor slips with respect to the other to generate electrical power that is transferred to the second electric machine to produce output torque.

12. The power conversion system as in claim 1, wherein the second electric machine has a stator and a rotor, and wherein the second electrical machine is configured to produce a generated electrical power from the output of the power conversion system, whereby one of said stator or said rotor of said second electric machine slips with respect to the other to produce said generated electrical power.

13. The power conversion system as in claim 1, wherein the torque input comprises a crank to provide said torque input and wherein at least one of the first electrical machine or second electric machine is coupled with said crank.

14. The power conversion system as in claim 1, further comprising a bicycle and wherein the power conversion system is coupled with said bicycle and wherein the power conversion system produces said output to propel the bicycle.

15. The power conversion system as in claim 14, wherein the bicycle comprises a bottom bracket and wherein the first and second electric machines are configured at least partially in the bottom bracket.

16. The power conversion system as in claim 14, wherein the bicycle comprises a bottom bracket and a driven wheel and wherein the first electric machine is configured in the bottom bracket and the second electric machine is coupled to the driven wheel.

17. The power conversion system as in claim 14, wherein the bicycle comprises a driven wheel and wherein the first and second electric machines are coupled to the driven wheel.

18. The power conversion system as in claim 14, wherein the bicycle comprises a first driven wheel and a second driven wheel and wherein the first electric machine is coupled to the first driven wheel and wherein the second electric machine is coupled to the second driven wheel.

19. The power conversion system as in claim 14, wherein the bicycle comprises a first driven wheel and a second driven wheel and wherein the first electric machine is coupled to the first driven wheel and wherein the second electric machine is coupled to the first driven wheel, and further comprising a third electric machine that is coupled to the second driven wheel.

20. The power conversion system of claim 1, wherein the first and second electric machines are transverse flux electric machines.

21. The power conversion system of claim 20, wherein the first and second electric machine are a bi-coupled electric machine.

22. The power conversion system of claim 1, wherein the torque input to the first electrical machine comprises gearing.

23. The power conversion system of claim 22, wherein the gearing between the torque input and the first electrical machine comprises planetary gearing.

24. An electric bicycle comprising a power conversion system comprising:
- a gearless electrical machine assembly comprising:
  - a first machine comprising a rotor and a stator; and
  - a second electric machine;
  - a torque input to the first electric machine, wherein said torque input is a human powered input that rotates one of said rotor or stator of said first electric machine;
  - an output of the power conversion system;
  - wherein there is no planetary gearing configured between the first and second electric machines;
- a controller;
- wherein the gearless electrical machine assembly, with instructions from the controller, is configured to provide a variable ratio between said torque input of the first electric machine and said output of the power conversion system; and
- whereby one of said stator or said rotor slips with respect to the other to generate electrical power that is provided back to the output of the power conversion system wherein said generated electrical power is transferred to the second electric machine to produce output torque that propels the bicycle; and
- wherein said human powered input to the first electrical machine passes mechanically to the output of the second electric machine and any differences in power required for ratio changes are exchanged electrically between the first electrical machine and the second electrical machine;
- wherein the power conversion system is coupled with said bicycle and wherein the power conversion system produces said output to propel the bicycle; and
- wherein said torque input to the first electrical machine passes mechanically to the output of the power conversion system to propel the bicycle, and any differences in power required for ratio changes are exchanged electrically between the first electrical machine and the second electrical machine via a power cable or a shared armature.

25. The electric bicycle of claim 24, further comprising a battery that stores energy from the power conversion system.

26. The electric bicycle of claim 24, wherein all wheels are driven with both directions of torque to maximize efficiency and or traction for acceleration and or braking and or steering control.

27. The electric bicycle of claim 24 wherein the first electrical machine and second electric machine are transverse flux electric machines.

28. The electric bicycle of claim 27, wherein the first electrical machine and second electric machine are a bi-coupled electric machine.

29. The electric bicycle of claim 28, wherein both of the first electrical machine and second electric machine are coupled to a rider-input driven wheel.

30. The electric bicycle of claim 29, further comprises a crank to provide said torque input and wherein at least one of the first electrical machine or second electric machine is coupled with a crank.

31. The electric bicycle of claim 30, wherein the torque input from the crank to the first electrical machine comprises gearing to shift to a torque-speed range.

32. The electric bicycle of claim 31, wherein the gearing between the torque input from the crank to the first electrical machine comprises planetary gearing.

33. The electric bicycle of claim 24, wherein the second electric machine has a stator and a rotor, and wherein the second electrical machine is configured to produce a generated electrical power from the output of the power conversion system, whereby one of said stator or said rotor of said second electric machine slips with respect to the other to produce said generated electrical power.

* * * * *